United States Patent [19]

Van Bilderbeek et al.

[11] 4,074,912
[45] Feb. 21, 1978

[54] RELEASABLE RIGID PILE CONNECTOR APPARATUS

[75] Inventors: Bernard H. Van Bilderbeek, Ventura, Calif.; John E. Maingot, Houston, Tex.; James M. Walker, Oxnard, Calif.

[73] Assignee: Vetco Offshore Industries, Inc., Ventura, Calif.

[21] Appl. No.: 724,635

[22] Filed: Sept. 20, 1976

[51] Int. Cl.² .......................................... F16L 37/00
[52] U.S. Cl. .................................... 285/39; 285/86; 285/309; 285/319
[58] Field of Search ............... 285/18, 403, 404, 309, 285/308, 319, 86, 85, 84, 310, 39, 321, 90; 61/53; 166/242

[56] References Cited

U.S. PATENT DOCUMENTS

| | | | |
|---|---|---|---|
| 3,051,244 | 8/1962 | Litchfield | 285/18 X |
| 3,148,894 | 9/1964 | Schwab | 285/18 X |
| 3,155,401 | 11/1964 | Musolf | 285/133 A X |
| 3,273,915 | 9/1966 | Bishop et al. | 285/18 |
| 3,585,803 | 6/1971 | Bardgette | 285/321 X |
| 3,827,728 | 8/1974 | Hynes | 285/90 |
| 3,966,236 | 6/1976 | Vann | 285/39 |

FOREIGN PATENT DOCUMENTS 2,163,218  7/1972  Germany ............................. 285/319

*Primary Examiner*—Thomas F. Callaghan
*Attorney, Agent, or Firm*—Subkow and Kriegel

[57] ABSTRACT

A connector apparatus particularly useful in pile driving in water to enable a pile string to be released or disconnected in the vicinity of the mudline after the pile has been driven to its final depth, the connector including an upper box secured to one portion of a pin apparatus attached by a releasable mechanism to another lower portion of the pin apparatus, release of the mechanism by a suitable tool operated from a remote location enabling the drive pile string above the lower portion of the pin to be withdrawn through the water to the surface.

11 Claims, 7 Drawing Figures

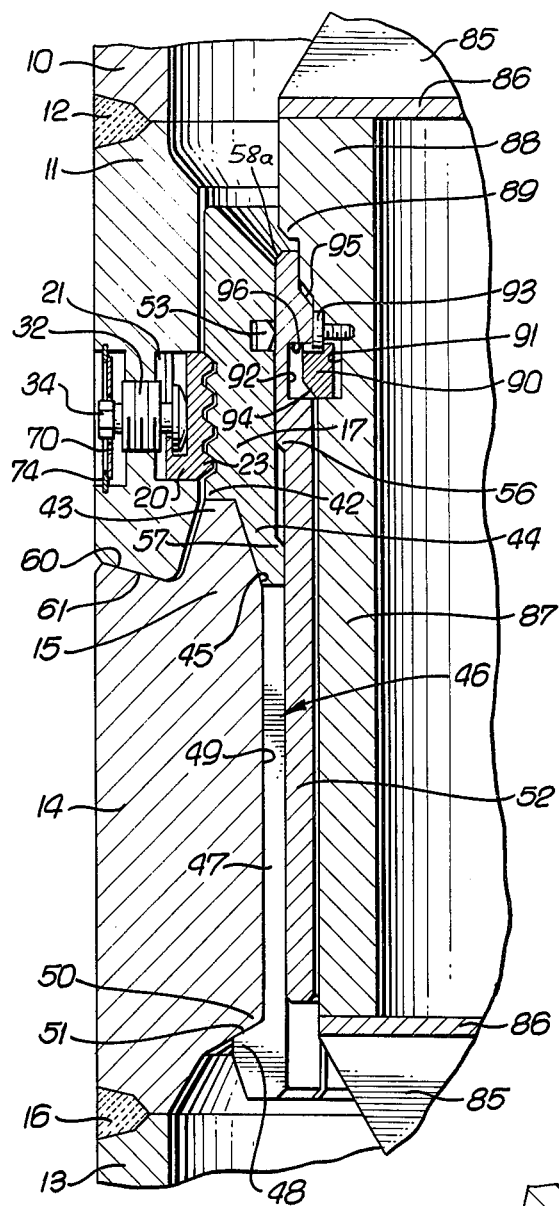

RELEASABLE RIGID PILE CONNECTOR APPARATUS

The present invention relates to pipe connector apparatus, and more particularly to pile apparatus adapted to be driven into a formation underlying a body of water.

Difficulties have been encountered in connection with the release of a drive pile string in the vicinity of a mudline once a pile has been driven to its final depth. This pile drive string may extend through several hundred feet of water and be driven into the ocean floor to a required depth. It is desirable to release a connector forming part of the pile drive string in the vicinity of the mudline.

By virtue of the present invention, a releasable connector is provided for securing adjacent pile or pipe sections to each other which can form a rigid pile string capable of remaining connected under the action of the impact blows imparted successively to it. The connector does not tend to separate under the rebound to which the pile string is subjected following each hammer blow, but is still capable of reliable and relatively easy release when disconnection of the connector at the mudline is desired. With the connector forming the subject of the present invention, a rigid, releasable connector is provided in which the release can be effected without difficulty and without requiring the application of torque to any portions of the drive pile string and to any portions of the connector itself. More specifically, release is effected by running a tool on a wireline or drill type to the location of the connector, which is secured to part of the connector apparatus, and an axial pull then taken on the wireline or drill pipe secured to the tool. Release occurs as a result of subjecting the wireline or drill pipe, the tool and the portion of the connector that affects the release to a nominal tensile load. Nevertheless, the connector, prior to its release, is a rigid one and is composed of parts secured togehter and subjected to a prestressed or preloaded condition to hold the connector parts compressed against one another, so that they do not separate at all as a result of rebound during the pile driving operation.

This invention possesses many other advantages, and has other purposes which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense.

Referring to the drawings:

FIG. 4 is an enlarged longitudinal section through the connector apparatus and releasing tool disclosing the retaining sleeve of the apparatus being released;

FIG. 5 is a view similar to FIG. 4, with the releasing tool and retaining sleeve removed and the box and upper pin section being removed from the lower pin section;

FIG. 6 is a cross-section taken along the line 6—6 on FIG. 5; and

Figure 1:
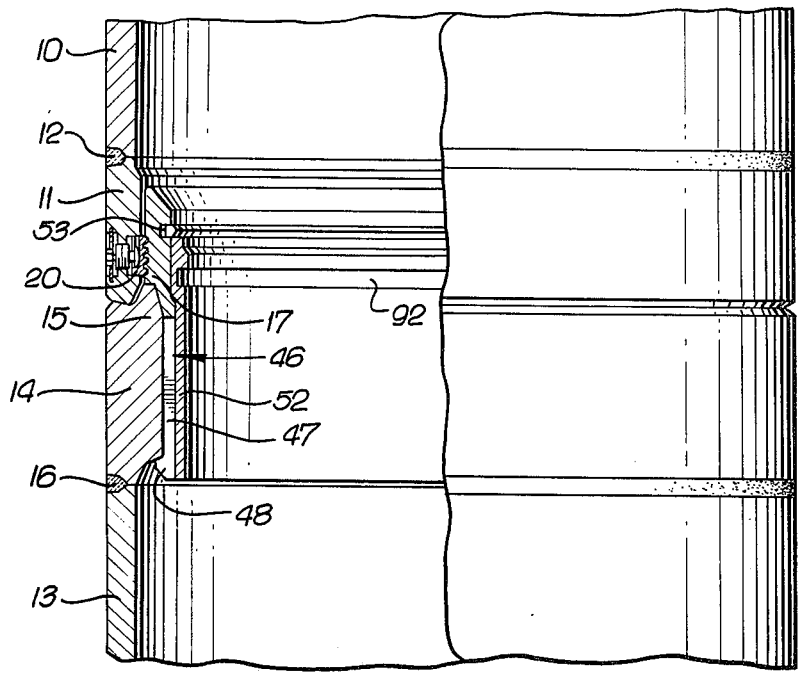
FIG. 1 is a longitudinal section through the connector apparatus with the pin and box of the connector secured to each other.
Figure 7:
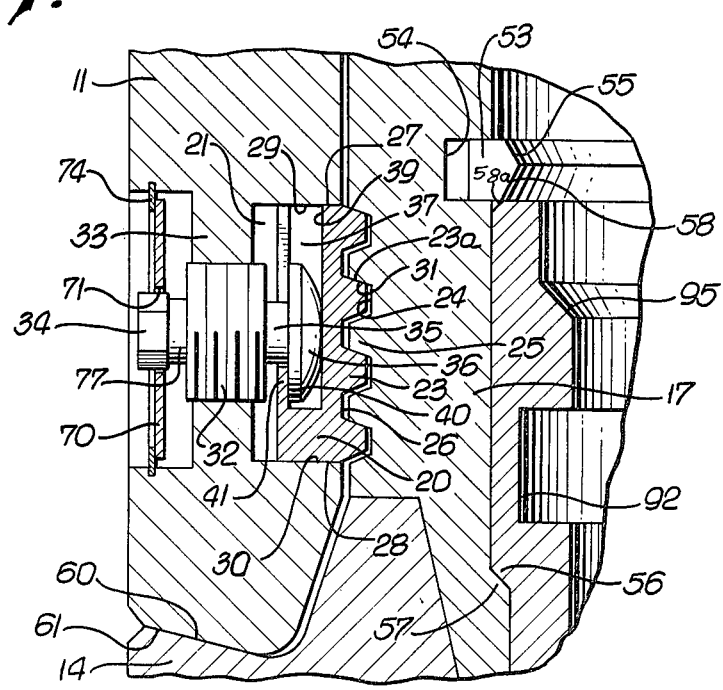
FIG. 7 is an enlarged longitudinal section through a portion of the apparatus shown in FIG. 1.
Figure 2:
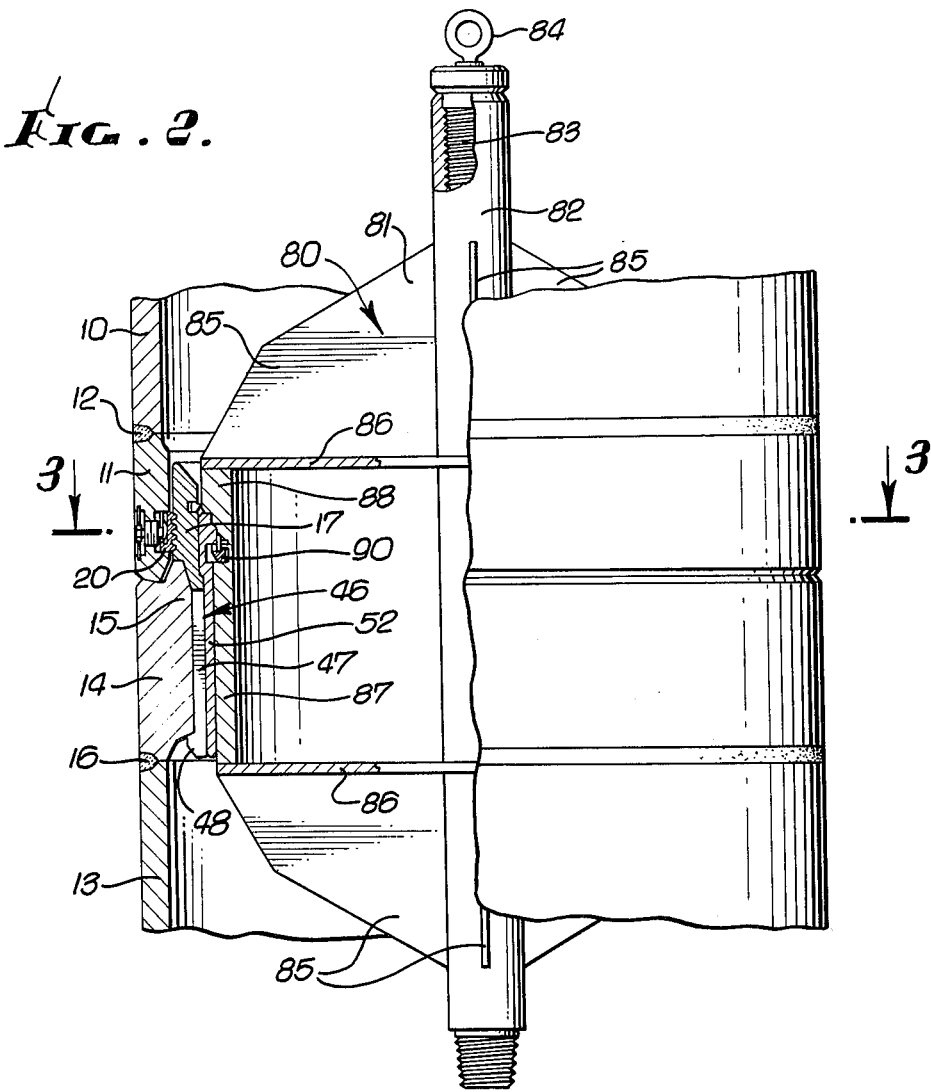
FIG. 2 is a longitudinal and elevational view of a releasing tool latched to the connector.
Figure 3:
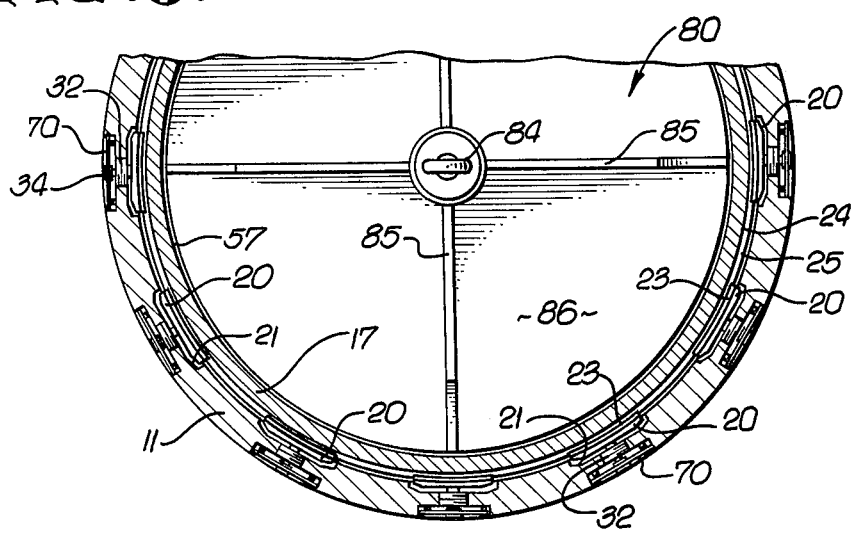
FIG. 3 is a cross-section taken along the line 3—3 on FIG. 2.

As disclosed in the drawings, an upper pipe section 10 has a lower box portion 11 secured to it, as by a circumferentially continuous weld 12. A lower pipe section 13 has the lower section 14 of a pin 15 secured thereto by a circumferentially continuous weld 16. The lower pin section is releasably secured to an upper section 17 of the pin disposed within the box. The external surfaces of the lower pin section 14 and box 11 are flush with respect to one another, and also with respect to the upper and lower pipe sections 10, 13 to eliminate outwardly extending protuberances that might interfere with the driving of a pile into the formation, such as a formation underlying a body of water.

The pin 15 and box 11 are secured together against relative longitudinal movement by a plurality of circumferentially spaced horizontally movable lock members or dogs 20 disposed in openings or windows 21 in the box and adapted to be shifted inwardly into one or more circumferentially continuous grooves 22 in the upper section 17 of the pin. Each dog is of substantial arcuate extent having one or more inwardly directed rib portions or teeth 23 adapted to move within the external grooves 24 of the upper pin section. The intervening portion or teeth 25 on the upper pin section are adapted to be received within grooves 26 formed between the lock dog ribs or teeth. The dogs are circumferentially spaced from one another, being of a suitable number, depending upon the diameter of the pipe sections and of the pin and box secured thereto. The greater the diameter, the greater number of dogs spaced around the box and pin. Each dog 20 has top and bottom parallel surfaces 27, 28 adapted to move radially within its window 21 and along the companion top and bottom surfaces 29, 30 of the window.

Each dog is adapted to occupy a completely retracted or outward position in which its teeth or ribs 23 are disposed entirely within the confines of the window 21. The dog can be shifted radially inwardly to cause its ribs to move into the upper pin section grooves 24 and into engagement with the upper sides 31 of the grooves. Such inward and also outward movement of each dog is secured by providing a screw 32 threaded into an intermediate partition 33 of the window, this screw having an outer head 34 to which a suitable wrench (not shown) can be applied for rotating the screw in both directions, and also possessing a smaller diameter shank 35 terminating in an inner thrust head 36.

The shank 35 can be moved downwardly within a T-shaped slot 37 in the outer portion of each lock dog when the screw 32 is being assembled to the latter, the large diameter thrust head 36 moving downwardly within the wider part of the slot with its outer margins 38 received within the outer portions of the wider slot. The thrust head 36 of the screw is adapted to bear inwardly against the base 39 of the larger slot, the outer margins 40 of the head being adapted to engage the opposed outer rib portions 41 of the dog, through which the reduced diameter shank 35 extends for the purpose of shifting the dog 20 outwardly in the event the upper pin section 17 and dog are to be released from one another.

The upper pin section 17 is releasably secured to the lower pin section 14 by resting a downwardly facing shoulder 42 on the upper pin section against the upper end 43 of the lower pin section 14, a depending skirt 44 of the upper pin section tapering in a downward and inward direction and engaging a companion tapered surface 45 on the upper portion of the lower pin section. The upper and lower pin sections 17, 14 are secured to one another by a latch device 46 integral with the upper portion of the upper pin section 17 and including a plurality of depending latch legs 47 terminating in outwardly directed latch feet 48. The legs extend along the inner surface 49 of the lower pin section and the feet extend under a shoulder 50 which tapers in a downward and outward direction to be engaged by a companion tapered surface 51 on the upper portion of each of the feet.

A retaining sleeve 52 is disposed within the upper pin section and its latch portion 46, which forces the legs 47 and latch feet 48 outwardly to provide a snug engagement of the shoulder 42 against the upper end 43 of the lower pin section 17, and of the tapered feet 48 against the tapered lower shoulder 50 of the lower pin section 14. This retaining sleeve is initially held in its latching position by a split lock ring 53 received within an internal circumferential groove 54 in the upper circumferentially continuous portion of the upper pin section 17 and extending across the upper end of the retaining sleeve 52. This ring has an upper downward and inwardly directed tapered surface 55 for engagement by the lower end of the retaining sleeve 52 when it is being inserted into the lower pin section 17, for the purpose of expanding the split lock ring 53 and permit the retaining sleeve to be shifted downwardly to its full extent until a shoulder 56 on the retaining sleeve engages a companion shoulder 57 therebelow on the upper pin section 17, at which time the lock ring 53 can contract inherently partially over the upper end of the retaining sleeve 52 to secure it in its position holding the latch feet 48 under and snugly engaged with the tapered end 50 of the lower pin section. As described hereinbelow, elevation of the retaining sleeve will cause its upper outer bevelled end 58a to engage a lower tapered surface 58 of the lock or latch ring 53 to expand the latter outwardly within its groove 54 to permit the retaining sleeve to be elevated from the upper pin section 17 and its depending latch portion 46.

In assembling each screw 32 and dog 20 in the apparatus, prior to insertion of the upper part of the lower pin portion 17 into the box 11, the inner shank 35 and head 36 of each screw are moved downwardly into the slot 37, which opens through the top of the dog. The screw is then inserted from the interior of the box through its window 21, the screw 32 is then being turned in the appropriate direction, as to the left, to thread its screw portion within a companion threaded bore in the partition 33, the outward threading being continued until the dog 20 moves completely inwardly of the inner wall of the box. After all of the lock dogs and screws have been assembled within the box and shifted to their extreme outward positions, the box 11 can be disposed over the assembly of the upper pin portion 17 and the upper part of the lower pin portion 14, which have been previously secured together by the latch legs 47 and feet 48 and retained in coupled position to one another by the retaining sleeve 52. Each screw 32 is then rotated in the appropriate directions, as to the right, to force the lock dog teeth 23 into the pin grooves 24. It is to be noted that the inner portion of each dog is curved to conform to the curvature of the upper pin section 17 to provide a greater contacting area between the dog ribs or teeth and the upper sides 31 of the pin grooves.

The upper sides 23a of the ribs 23 and the upper sides 31 of the grooves are disposed at an angle to a plane normal to the axis of the pin and box, such that rotation of the screws forcing the lock members 20 inwardly will shift the composite pin structure 14, 17 relatively in an upper direction within the box 11. Rotation and actuation of the screws will cause the heads 36 to bear against the lock dogs 20 and shift their tapered surfaces 23a against the tapered surfaces 31 on the upper pin section 17, until a shoulder 60 on the lower pin section 14 bears against the lower end 61 of the box. Continued application of torque through the screws will tend to force the pin structure 14, 17 further inwardly of the box, and will compress the shoulder 60 to a further extent against the lower end 61 of the box, applying a compression preload to the connector. The screws are further tightened until the desired compression or preload exists between the pin shoulder and the lower end of the box. Such compressive force can be very large since the area over which the force is transmitted is circumferentially continuous around the pin shoulder 60 and box end 61.

The connector illustrated and described effects a metal-to-metal seal between the pin structure 50 and box 11, providing a tight rigid joint therebetween. The stored energy in the pin structure and box enables the connector to be subjected to high impact forces, such as occurs when the pipe string is being used for pile driving purposes and substantial rebound effects which might tend to separate the shoulder 60 and box end 61 from one another. The preload compression imposed upon the pin and box members is greater than the rebound effect, or of any tensile or bending load that might be imposed upon the pipe string, thereby preventing separation of the pin shoulder and box end from one another.

Each screw 32 may be locked in the position in which it has been turned to prevent vibration or other forces from tending to back off the actuating screw and thereby loosen its associated lock dog. A lock plate 70 is located in an outer portion of the window on the exterior side of the partition 33 and is reciprocable with respect to the actuator screw 32, having a non-circular or hexagonal opening 71 conforming to and adapted to receive the head 34 of the actuator screw when the lock plate is in its normal position. The box has radial slots 72 adjacent to the outer portion of the window receiving ears 73 of the lock plate, to permit axial but non-rotative movement of a plate in the box. A split retainer ring 74 is disposed in the window and fixed to the box to limit outward movement of the lock plate to a location in which the actuator screw head 34 is disposed in the complemental opening 71 of the plate. A pair of compression springs 75 extends between the ears 73 of each lock plate and sockets 76 in the box, normally biasing the lock plate 70 to its outer position, in which the screw head is disposed in the non-circular plate opening to prevent rotation of the actuator screw. However, the application of a wrench to the screw head 34 will cause the wrench to inwardly displace the lock plate to a location in which it is disposed about a reduced diameter circular portion 77 of the actuator screw, permitting the screw to be rotated by the wrench in either direction. When the wrench is removed from the screw head, the lock plate 70 is biased automatically by the springs 75 to a screw locking position.

After the pile has been driven to its final depth, the connector adjacent to the mudline is to be released, so that the pile string upwardly therefrom can be removed through the water to the surface. To accomplish this objective, a releasing and retrieving tool 80 is lowered through the piling to the location of a particular connector that is to be released. As disclosed in the drawings, the releasing tool includes a body structure 81 composed of a central tube 82 which may have a plug 83 threaded into its upper end and to which an eye 84 is secured for reception of a wireline (not shown). Upper and lower radial ribs 85 are welded or otherwise suitably secured to the central tube 82 and to upper and lower plates 86 disposed on opposite sides of a cylinder or sleeve 87 to which they are welded, or otherwise suitably secured. The sleeve 87 has an external diameter throughout the major portion of its length which conforms to the internal diameter of the retaining sleeve 52. However, the upper portion 88 of the sleeve is enlarged to provide a transverse shoulder 89 adapted to rest upon the upper end of the retainer sleeve 52. When so resting upon the retainer sleeve, a split latch ring 90 disposed in an external groove 91 in the cylinder or sleeve will be aligned with an internal groove 92 in the retaining sleeve, this lock ring then expanding partially into the internal groove to the extent limited by its engagement with one or a plurality of limit screws 93 secured to the cylinder.

The lock ring has an outer portion 94 tapered in an downward and inward direction to engage the tapered surface 95 on the retaining sleeve and be shifted inwardly of its external groove 91, moving along the internal surface of the retaining sleeve until it is disposed in alignment with the internal groove 92 of the retaining sleeve, whereupon the lock ring expands outwardly partially into that groove. At that time, a transverse ring shoulder 95 normal to the axis of the releasing and retrieving tool will be in a position to engage the upper side 96 of the internal groove, thereby coupling the retaining sleeve 52 to the tool 80. An upward pull then taken on the wireline will move the tool body 81 lock ring 90, and retaining sleeve 52 in an upward direction, the upper bevel 58a on the sleeve camming the lock ring 53 outwardly to release the lock ring, enabling the retaining sleeve to be moved completely through the pipe or pile string to the surface.

Following removal of the retaining sleeve 52, an upward pull taken on the piling 10 and its box 11 will exert an upward force through the lock dogs 20 on the upper pin section 17, and will cause the tapered surface 50 on the lower pin section 14 to deflect the latch feet 48 inwardly, as disclosed in FIG. 5 to release the box 11 and the upper pin section 17 from the lower pin section 14, whereupon the upper piling 10, box 11 and upper pin section 17 can be removed through the water to the surface, leaving the lower pin section 14 as the uppermost part of the piling driven into formation.

If desired, a drill pipe (not shown) can be threadedly secured to the central tube 82 of the releasing and retrieving tool body, and be used for lowering the tool into its coupling relation to the retaining sleeve 52 and for releasing and elevating the retaining sleeve through the piling to the surface. In effecting the coupling of the tool 80 to the retaining sleeve 52 and the release of the retaining sleeve, no torque is required since a straight axial pull is merely required on the wireline or drill pipe.

With respect to the pin structure and box, a relatively simple, easily connectable, and preferably externally flush pipe connector has been provided to which a preload can be applied between the pin structure and box, for the purpose of preventing separation between their confronting surfaces, 60, 61, maintaining their coengaging parts under compression at all times. The preload can be quite extensive, particularly since the compressive load is transmitted over a large and full circumferential area between the coengaging pin shoulder 60 and box end 61. A rigid connector is provided which will not loosen under repeated impact blows from the pile driver, and which is capable of easy assembly in a rapid manner, thereby effecting substantial savings and cost of operation.

As noted above, connection of the releasing and retrieving tool 80 to the retaining sleeve 52 is effected without rotation being required. The release of the retaining sleeve 52 from its holding position behind the latch legs 47 and feet 48 is secured by the taking of a straight axial pull on the wireline or drill pipe, a nominal tensile load only being required on the parts to effect such removal of the retaining sleeve.

We claim:

1. A connector comprising a tubular pin structure, a tubular box structure, one of said structures including first and second sections, means releasably securing said sections to each other, the other of said structures and said first section having abutting transverse surfaces, means for connecting said second section and said other of said structures to each other to apply a compressive preload to said box structure and pin structure, and means for releasing said securing means to permit said second section and said other of said structures to be released from said first section.

2. A connector as defined in claim 1; said pin structure having said first and second sections, said box structure being said other of said structures, whereby release of said securing means permits said second section of said pin structure and said box structure to be released from said first section of said pin structure.

3. A connector as defined in claim 1; said securing means including a latch on one of said sections in coupling engagement with said other section, said securing means further including means retaining said latch in engagement with said other section, said releasing means being provided on said retaining means and being engageable by a tool to remove said retaining means from said latch.

4. A connector as defined in claim 1; said pin structure having said first and second sections, said box structure being said other of said structures, whereby release of said securing means permits said second section of said pin structure and said box structure to be released from said first section of said pin structure, said securing means including a latch on said second section in coupling engagement with said first section, said securing means further including means retaining said latch in engagement with said first section, said releasing means being provided on said retaining means and being engageable by a tool to remove said retaining means from said latch.

5. A connector as defined in claim 1; said securing means including a collet latch integral with one of said sections and having foot portions in coupling engagement with said other section, said securing means further including a retaining sleeve holding said foot portions in coupling engagement with said other section, said releasing means being provided on said sleeve, whereby engagement of said sleeve by a tool enables said tool to remove said sleeve from said collet latch.

6. A connector as defined in claim 1; said pin structure having said first and second sections, said box structure being said other of said structures, whereby release of said securing means permits said second section of said pin structure and said box structure to be released from said first section of said pin structure, said securing means including a collet latch integral with said second section and having foot portions in coupling engagement with said first section, said securing means further including a retaining sleeve holding said foot portions in coupling engagement with said first section, said releasing means being provided on said sleeve, whereby engagement of said sleeve by a tool enables said tool to remove said sleeve from said collet latch.

7. A connector comprising a tubular pin structure including first and second pin sections, releaseable means securing said pin sections to each other, said first section having an external shoulder, a tubular box telescopically disposed over said pin structure and having an end engaging said shoulder, lock means in said box shiftable radially thereof, said second section and said lock means having coengageable tapered surfaces, means for shifting said lock means radially inwardly of said box to force said lock means tapered surface against said second section tapered surface and shift said pin structure axially of said box to force said shoulder against said box end and apply a compressive preload to said box end and said pin structure, and means for releasing said releasable means to permit said box and second pin section to be released from said first pin section.

8. A connector as defined in claim 7; said securing means including a latch on said second section in coupling engagement with said first section, said securing means further including means retaining said latch in engagement with said first section, said releasable means being provided on said retaining means and being engageable by a tool to remove said retaining means from said latch.

9. A connector as defined in claim 7; said securing means including a collet latch integral with said second section and having foot portions in coupling engagement with said first section, said securing means further including a retaining sleeve holding said foot portions in coupling engagement with said first section, said releasing means being provided on said sleeve, whereby engagement of said sleeve by a tool enables said tool to remove said sleeve from said collet latch.

10. A connector as defined in claim 7; said securing means including a latch on said second section in coupling engagement with said first section, said securing means further including means retaining said latch in engagement with said first section, said releasable means being provided on said retaining means, and a tool movable into coupling relation to said retaining means to enable said tool to remove said retaining means from said latch.

11. A connector as defined in claim 7; said securing means including a collet latch integral with said second section and having foot portions in coupling engagement with said first section, said securing means further including a retaining sleeve holding said foot portions in coupling engagement with said first section, said releasing means being provided on said sleeve, and a tool movable into coupling relation to said sleeve to enable said tool to remove said sleeve from said latch.

* * * * *